United States Patent
Bridgewater

(10) Patent No.: US 8,628,285 B2
(45) Date of Patent: Jan. 14, 2014

(54) RETAINING NUT

(75) Inventor: Robert James Bridgewater, Bristol (GB)

(73) Assignee: Airbus Operations Limited, Bristol (GB)

( * ) Notice: Subject to any disclaimer, the term of this patent is extended or adjusted under 35 U.S.C. 154(b) by 563 days.

(21) Appl. No.: 12/805,080

(22) Filed: Jul. 12, 2010

(65) Prior Publication Data

US 2011/0033261 A1    Feb. 10, 2011

(30) Foreign Application Priority Data

Aug. 4, 2009   (GB) .................................. 0913506.2

(51) Int. Cl.
*F16B 39/36*    (2006.01)

(52) U.S. Cl.
USPC .......................................... 411/265; 411/270

(58) Field of Classification Search
USPC ......... 411/265, 204, 197, 198, 253, 260, 266,
411/268, 313, 314, 929.2, 935, 937.2;
285/257, 323, 333, 391, 411
See application file for complete search history.

(56) References Cited

U.S. PATENT DOCUMENTS

| | | | |
|---|---|---|---|
| 783,572 A * | 2/1905 | Gibbs ............................ | 411/249 |
| 1,324,012 A * | 12/1919 | Johnson ......................... | 411/270 |
| 1,376,296 A * | 4/1921 | Snow ............................. | 411/269 |
| 1,470,528 A * | 10/1923 | Flentjen ........................ | 411/237 |
| 1,840,187 A * | 1/1932 | Davis ............................ | 403/343 |
| RE23,640 E * | 3/1953 | Smith ........................... | 411/265 |
| 5,023,990 A | 6/1991 | Lee, II et al. | |
| 5,112,156 A | 5/1992 | Boyer | |
| 5,239,147 A * | 8/1993 | Allard et al. ............... | 200/61.54 |
| 5,544,991 A * | 8/1996 | Richardson ................... | 411/237 |
| 6,264,139 B1 | 7/2001 | Dazet | |

FOREIGN PATENT DOCUMENTS

| | | |
|---|---|---|
| GB | 2 255 385 | 11/1992 |
| GB | 2 308 154 | 6/1997 |

OTHER PUBLICATIONS

UK Search Report for GB 0913506.2, dated Nov. 19, 2009.
European Patent Office Search dated Nov. 3, 2010 in EP 10 16 8966.

* cited by examiner

*Primary Examiner* — Gary Estremsky

(74) *Attorney, Agent, or Firm* — Nixon & Vanderhye P.C.

(57) ABSTRACT

A retaining nut comprises a nut body and a plurality of axially extending integrally formed deflectable locking fingers. The locking fingers have a frusto-conical surface opposite a threaded surface. The frusto-conical surface of the locking fingers are adapted to co-operate with a conical washer. Tightening the threaded nut on a threaded shaft against the washer causes the locking fingers to deflect radially towards the shaft. This provides a secure radial clamping of the nut on the shaft.

17 Claims, 5 Drawing Sheets

RETAINING NUT

This application claims priority to GB Application No. 0913506.2 filed 4 Aug. 2009, the entire contents of which is hereby incorporated by reference.

FIELD OF THE INVENTION

The present invention relates to a retaining nut, a retaining nut and washer combination, and an assembly comprising a threaded shaft and a retaining nut and washer combination. The present invention also relates to a method of retaining a nut on a threaded shaft.

BACKGROUND OF THE INVENTION

A major problem with large diameter nuts is that they require a very high torque in order to ensure that sufficient bolt tension is created to maintain the tightness of the bolt. This high torque is often very difficult to achieve in a confined aircraft environment, for example. As a result, it is often impossible to prevent the nut from becoming loose without the use of special locking devices, such as an indexed locking device. The indexing device typically includes a series of splines around the circumference of one end of the bolt which are susceptible to corrosion issues.

This problem is not limited to bolts and applies equally to, for example, solid or hollow pivot pins having a threaded end. Such large diameter pins are regularly used to connect the main leg of an aircraft landing gear to a gear rib of an airframe, and as hinge or actuator pins for aircraft flight control surfaces. This problem is not limited to aerospace applications and may be found in virtually any large structure requiring a large diameter nut such as, for example, a crane.

SUMMARY OF THE INVENTION

A first aspect of the invention provides a retaining nut comprising a nut body and a plurality of axially extending integrally formed deflectable locking fingers, wherein the locking fingers have a frusto-conical surface opposite a threaded surface.

A second aspect of the invention provides a retaining nut and washer combination comprising a retaining nut in accordance with the first aspect, and a conical washer, wherein the frusto-conical surface of the nut locking fingers and a frusto-conical surface of the conical washer are co-operating plane contact surfaces.

A third aspect of the invention provides an assembly comprising a threaded shaft and the retaining nut and washer combination according to the second aspect, wherein the nut is threadably received on the shaft, and the frusto-conical surface of the washer and the locking fingers co-operate so as to deflect the locking fingers radially towards the shaft.

A fourth aspect of the invention provides a method of retaining a nut on a threaded shaft, the method comprising providing a retaining nut comprising a nut body and a plurality of axially extending integrally formed deflectable locking fingers, the locking fingers having a frusto-conical surface opposite a threaded surface; providing a conical washer; and threading the nut onto a threaded shaft such that frusto-conical surfaces of the washer and the locking fingers co-operate to deflect the locking fingers radially towards the shaft.

This invention is advantageous in that tightening of the retaining nut against an appropriate surface, such as a conical washer, causes the frusto-conical surface of the locking fingers to act as a ramping surface so as to deflect the locking fingers radially inwardly thereby causing the threaded surface of the locking fingers to firmly grip and bind with a threaded shaft. The locking fingers of the retaining nut act in a similar manner to a collet chuck of a drill. The retaining nut can be securely retained on a threaded shaft without the need to develop the sort of tension in the threaded shaft required to maintain the tightness of a standard nut. As a result, the installation torque required to secure the retaining nut is significantly reduced, and the predictable manner in which the locking fingers deflect to retain the nut on the threaded shaft leads to a more flexible installation torque.

The locking fingers are preferably arranged around the entire circumference of the nut with a gap between adjacent locking fingers so as to allow for their radially inward deflection.

The nut body itself may have a smooth central bore that preferably has an internal thread of the same diameter as the threaded surface of the un-deflected locking fingers. A circumferential groove is preferably provided between the threaded surfaces of the nut body and the locking fingers. This groove promotes deflection of the locking fingers by providing a waisted region.

The nut body may have one or more drive features for engagement with a drive tool for rotating the nut. The drive feature(s) may be, for example, spanner slots for co-operating with the arms of a C-spanner. However, the drive features may take virtually any form, such as a detent, a protrusion, a multi-faceted surface, or similar. The drive features may be used for rotating the nut so as to tighten or loosen the nut.

The angle of inclination of the frusto-conical surface of the locking fingers with respect to the nut axis is important. This angle is typically between approximately 10 to 15° so as to provide an appropriate balance between improved mechanical advantage and undesirable jamming of the nut on the threaded shaft afforded by a greater ramp angle.

The conical washer may have one or more drive features for engagement with a drive tool for rotating the washer. These drive features are typically provided around the outer surface of the conical washer. These drive features may be a series of detents or projections, and preferably is a series of spanner slots for receiving a C-spanner or the like. It may be necessary to rotate the washer with respect to the nut during service so as to separate these components from seizure.

The thread of the deflected locking fingers and those of the shaft are intended to bind to prevent rotation of the nut with respect to the shaft when the locking fingers are deflected radially towards the shaft. This provides a secure engagement and therefore retention of the nut on the shaft. The threaded shaft preferably comprises a threaded end and a shank of greater diameter than the threaded end. The shank may have no external thread. The washer may be disposed between the nut and the shank such that an exposed annular end surface of the shank adjacent the threaded end provides a bearing surface.

A sleeve may be disposed around the shank of the shaft, the sleeve having a flange at one end disposed between the washer and the shank. The outer surface of the sleeve may act as a bearing surface.

The sleeve and the shank may have co-operating features to prevent rotation of the sleeve with respect to the shaft. These co-operating features may, for example, be a set of splines, or one or more "dogs" for engagement with a respective recess. Prevention of rotation of the sleeve with respect to the threaded shaft helps to prevent loosening of the nut in service.

According to one embodiment, the threaded shaft is an aircraft landing gear pivot pin used to connect the main leg of an aircraft landing gear to an airframe lug. However, the retaining nut has application to a variety of threaded shafts including various pins and bolts used in aerospace and non-aerospace applications.

Although this invention is not so limited, it has particular application to large diameter retaining nuts having an outer diameter greater than 25 mm, and preferably greater than 40 mm.

The clamping effect of the threaded deflectable locking fingers of the retaining nut upon a threaded shaft will generally be sufficient alone to securely retain the nut on the shaft. However, in some circumstances it may be beneficial to provide additional retaining means. For example, additional retention can be achieved by wire locking between the nut and the threaded shaft, or by wire or tab washer locking between the nut and the washer. The washer may also incorporate a tab for engagement with a keyway in the threaded end of the shaft. These additional retention means are known in the art, and in combination with this invention can provide a very high integrity locking arrangement.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
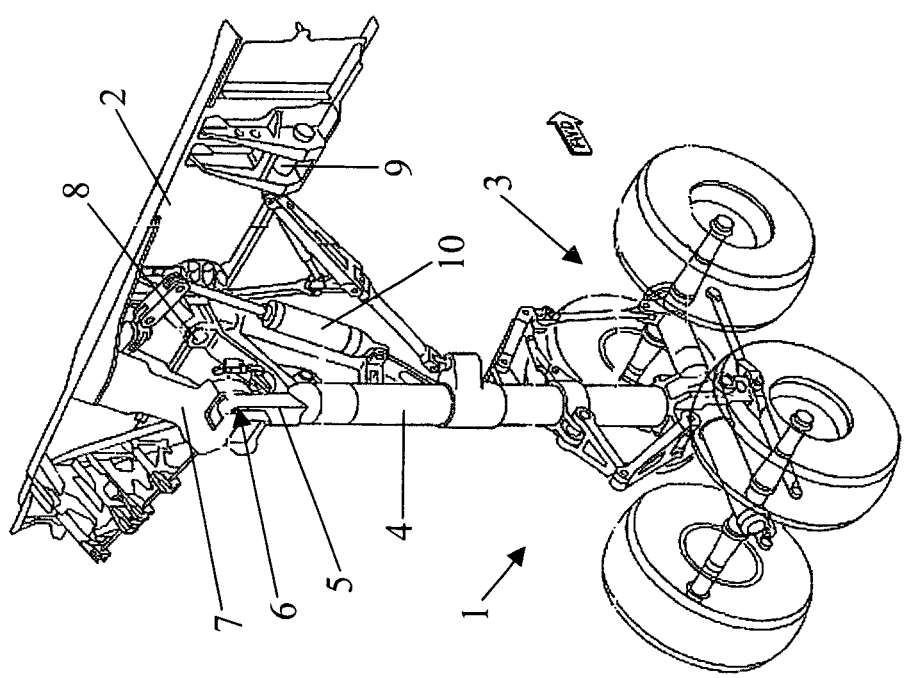
FIG. 1 shows a partially cut-away view of an aircraft main landing gear mounted to the rear spar of an aircraft wing with the gear in its extended position.

FIG. 1 shows a typical main landing gear for a medium to large transport aircraft. The landing gear 1 is attached to the rear spar 2 of the aircraft wing. The landing gear 1 comprises a double axle wheeled bogie 3 pivotally connected to a main strut 4. The main strut 4 has a main leg 5 at its upper end pivotally connected by an aft pintle pin 6 to a gear rib 7 fixed to the rear spar 2. The landing gear 1 is also pivotally connected to the rear spar 2 about forward pintle pin 8 and carden pin 9. The forward pintle pin 8 attaches the rear spar 2 to the main leg 5 and the carden pin 9 attaches the rear spar 2 to a forward side-stay of the landing gear 1. An actuator 10 controls movement of the landing gear 1 between stowed and extended positions by rotation of the main strut 4 with respect to the gear rib 7 about the aft pintle pin 6.

Figure 2:
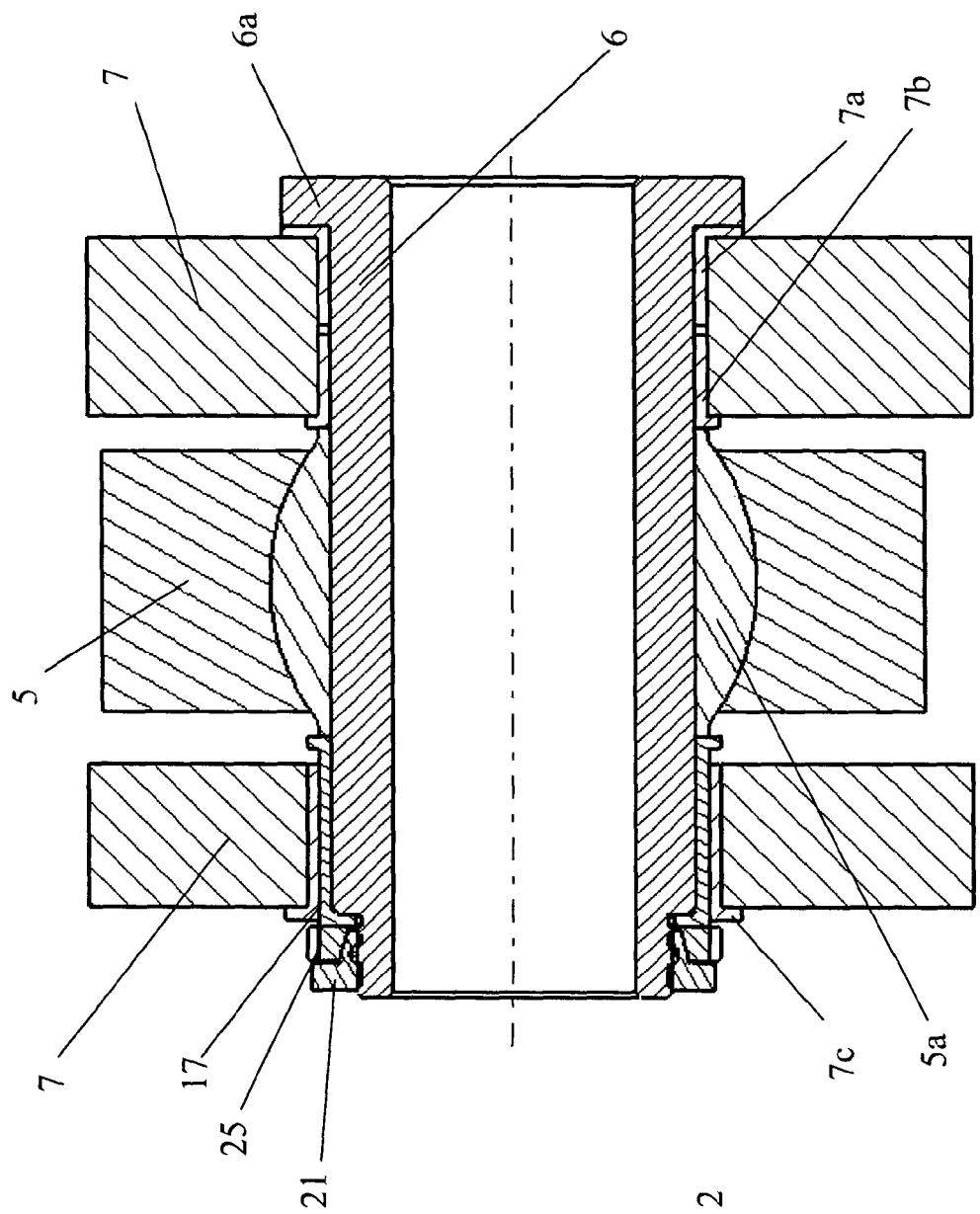
FIG. 2 shows a section view through the pinned lug joint between the landing gear main leg and the airframe gear rib.

The pinned lug joint between the gear leg 5 and the gear rib 7 will now be described in greater detail with reference to FIG. 2. FIG. 2 shows a section view through the pinned lug joint. The gear rib 7 has a pair of lugs forming a clevis extending generally horizontally in an inboard direction towards the aircraft fuselage (not shown). The main leg 5 has a lug which is disposed in the clevis of the gear rib 7. The main leg 5 is pivotally connected to the gear rib 7 by the aft pintle pin 6 which passes through the clevis and the lug. The clevis of the gear rib 7 and the lug of the main leg 5 include bushings 5a, 7a, 7b, 7c which receive the aft pintle pin 6. The pin 6 has a generally smooth outer diameter shank portion, and enlarged head portion 6a at one end, and a threaded portion of reduced diameter at its opposite end.

Figure 3:
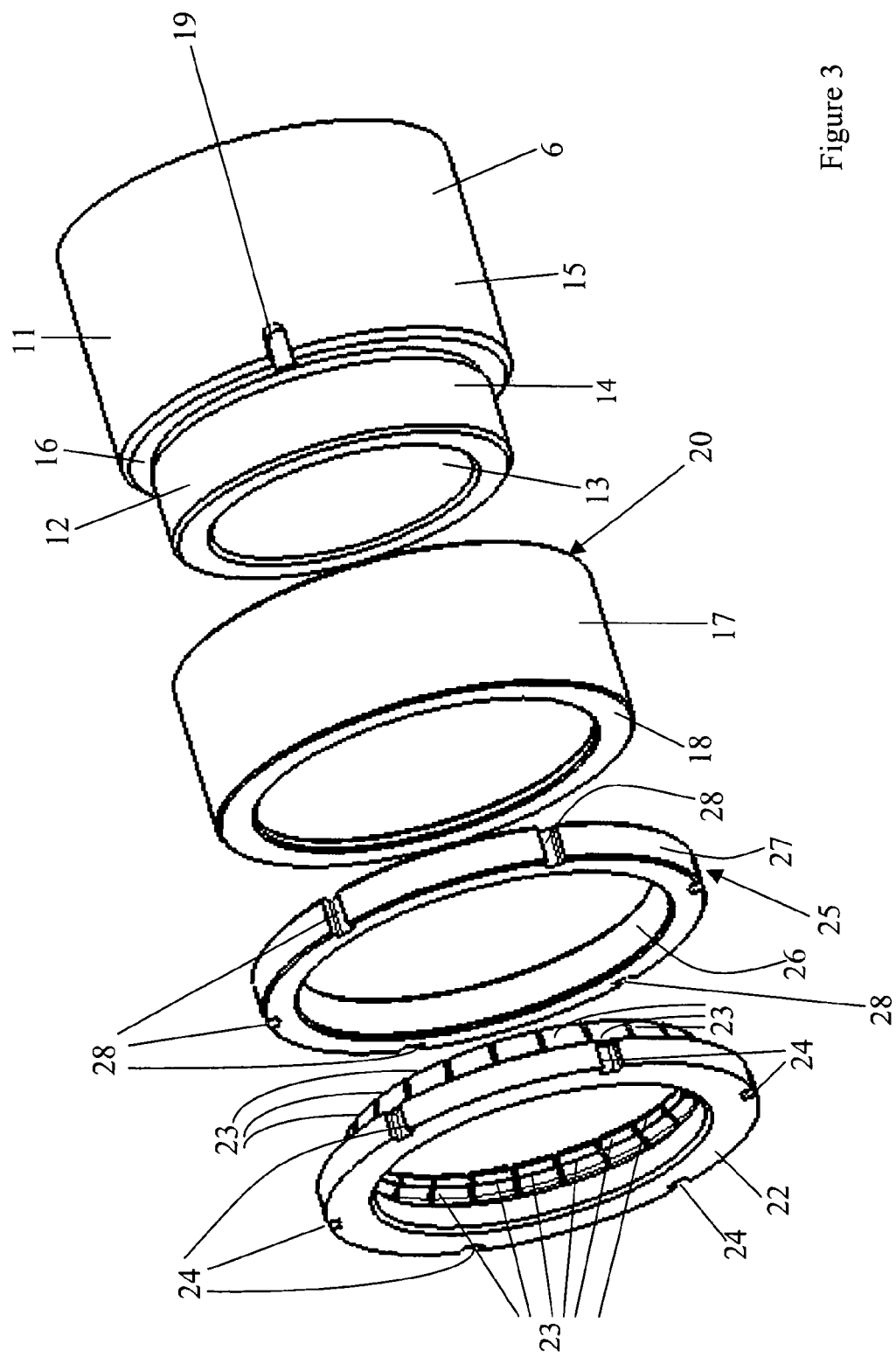
FIG. 3 shows an exploded view of one end of the main landing gear aft pintle pin, a sleeve, a conical washer and a retaining nut for the pinned lug joint of FIG. 2.

The end of the pin 6 having the threaded portion is shown in the exploded view of the retaining nut assembly of FIG. 3. The pin 6 includes a hollow tubular shank portion 11 and a threaded portion 12 of reduced diameter compared to the outer diameter of the shank portion 11. The pin 6 has an inner bore 13. The threaded portion 12 defines a threaded outer surface 14 and the shank portion 11 defines a smooth outer surface 15. Due to the difference in diameter between the threaded portion 12 and the shank portion 11a radially disposed end face 16 is formed between the threaded portion 12 and the shank portion 11. The outer edge of the end face 16 is chamfered.

A sleeve 17 has a radially inwardly facing flange 18 at one end. The sleeve 17 is adapted to be received over the outer surface 15 of the shank portion 11 with the inner surface of the flange 18 against the end face 16 of the shank portion 11. The outer surface 15 of the shank portion 11 includes a dog 19 which engages with a corresponding protrusion (not shown) extending from the inner surface of the sleeve 17. The dog 19 and its corresponding protrusion act to prevent relative rotation between the sleeve 17 and the pin 6 when the sleeve 17 is disposed over the pin 6.

The sleeve 17 is adapted to fit within one of the lugs of the gear rib 7 clevis. To retain the pin 6 in position in the clevis, a retaining nut and washer combination is torque tightened on the threaded end portion 12 of the pin 6. The retaining nut and washer combination will be described in greater detail below.

As shown in FIG. 3, the retaining nut 21 includes a nut body 22 and a plurality of axially extending, integrally formed, deflectable locking fingers 23. The outer surface of the nut body 22 includes a plurality of spanner slots 24 for receiving a C-spanner for rotating the nut 21.

Between the retaining nut 21 and the sleeve 17 is a conical washer 25. The conical washer 25 has a frusto-conical inner surface 26 and a cylindrical outer surface 27. The outer surface 27 includes a plurality of spanner slots 28 for receiving a C-spanner for rotating the conical washer 25. The retaining nut 21 and conical washer 25 combination will be described in greater detail with reference to FIGS. 3 and 4 below.

Figure 4:
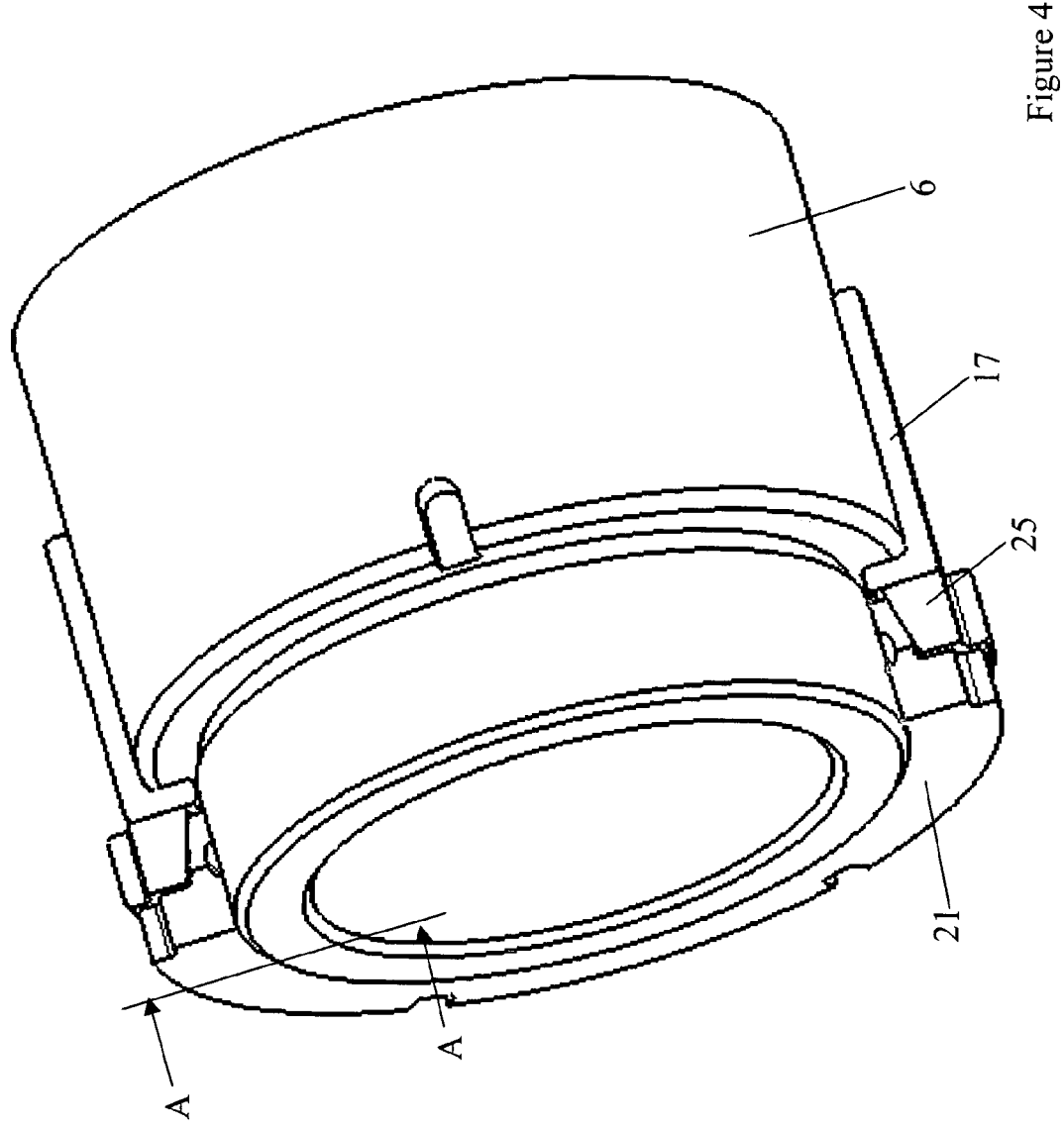
FIG. 4 shows a partially cut-away view of the assembly of FIG. 3 in use.

FIG. 4 shows a partially cut-away view of the pin 6, the sleeve 17, the retaining nut 21 and the conical washer 25. A section view through the assembly of FIG. 4 along A-A is shown in FIG. 5.

Figure 5:
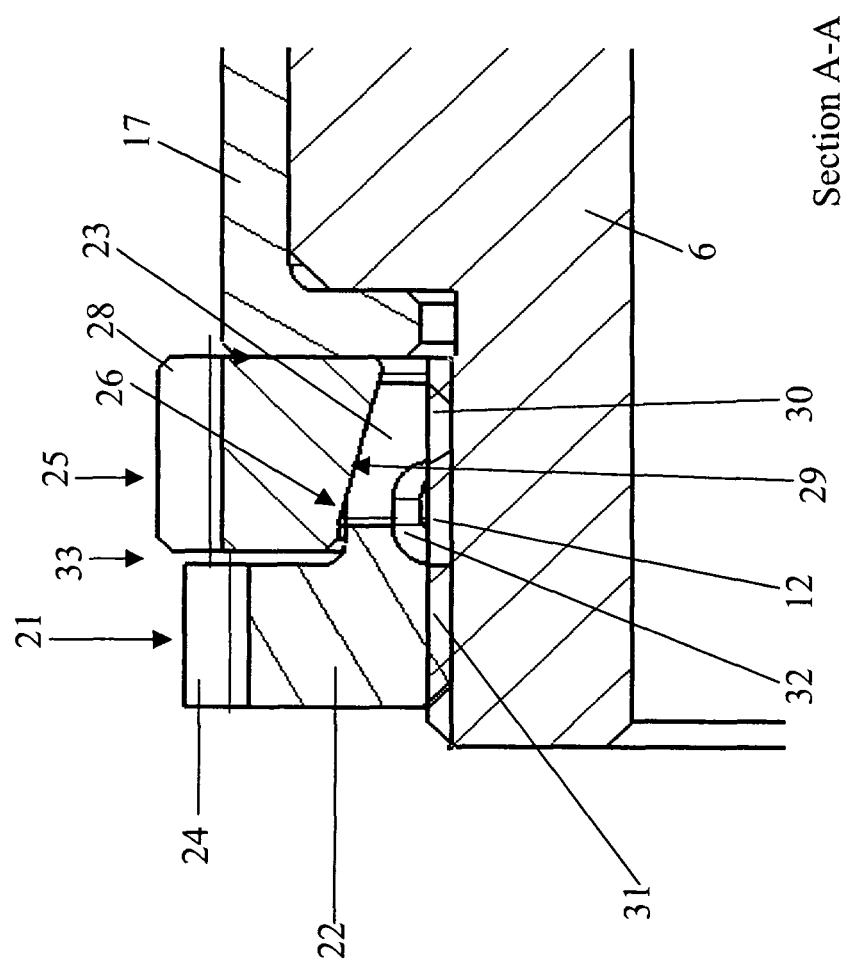
FIG. 5 shows a partial section view along A-A of FIG. 4.

As can be seen from FIG. 5, the locking fingers 23 of the retaining nut 21 have a frusto-conical outer surface 29 opposite a threaded inner surface 30. The threaded surface 30 is threadably engaged with the threaded outer surface 14 of the threaded portion 12 of the pin 6. The nut body 22 also has a threaded inner surface 31 which is threadably engaged with the threaded portion 12 of the pin 6. The nut 21 includes a circumferential groove 32 between the threaded portions 30 and 31. The circumferential groove 32 forms a waisted region so as to provide a degree of flexibility of the locking fingers 23, which are deflectable in a radial direction with respect to the nut body 22. The internal thread 31 of the nut body 22 is of the same diameter as the internal thread 30 of the un-deflected locking fingers 23.

The frusto-conical inner surface 26 of the washer 25 co-operates with the frusto-conical outer surface 29 of the locking fingers 23. The angle of inclination of the frusto-conical surfaces 26, 29 of the washer 25 and nut 21, respectively is between approximately 10° and 15° with respect to the nut axis of rotation.

By threading the nut 21 onto the threaded portion 12 of the pin 6, the frusto-conical surfaces 26 and 29 co-operate so as to deflect the locking fingers 23 of the nut 21 radially inwardly. The nut 21 is torque tightened such that its threaded portion 30 grips the threaded portion 12 of the pin 6 in a conventional axial sense, and the ensuing deflection of the locking fingers 23 causes the threaded portion 30 to also securely grip the threaded portion 12 in a radial sense. This radial clamping motion is similar to the way in which a collet chuck works. More particularly, as the nut 21 is tightened the free standing washer 25 bears against the sleeve 17 and further tightening of the nut 21 causes the clamping engagement of the threaded locking fingers 23 onto the threaded portion 12 of the pin 6 until a predetermined tightening torque is achieved. The sleeve 17 bears against the bushing 5a, which in turn bears against the bushings 7a, 7b and ultimately the pin head 6a to generate the axial tension in the pin 6. The nut 21 and washer 25 combination are dimensioned such that a gap 33 remains between opposing faces of the nut 21 and washer 25 at the predetermined maximum tightening torque. This ensures that the radial clamping force dominates the axial tightening load due to tightening of the nut 21, thereby ensuring secure retention of the nut 21 on the threaded portion 12 of the pin 6.

By comparison with prior art retaining nuts which provide only axial tension in the pin 6, the installation torque required to securely retain the nut 12 is reduced. Moreover, the tightening torque required may be applied with greater flexibility. As a result, the torque required to securely retain the nut 21 on the threaded portion 12 of the pin 6 is significantly reduced, and since the dominant securing load is radial rather than axial, the tightness of the nut 21 is not so affected by changes in the axial tension in the pin 6 during service. This provides for a more reliable nut retention.

Additional means for preventing rotation of the nut 21 with respect to the pin 6 may be provided in addition to the clamping arrangement afforded by the present invention. For example, additional retention can be achieved by wire locking between the nut 21 and the pin 6, or by wire or tab washer locking between the nut 21 and the washer 25. The washer 25 may further include a tab for engagement with a keyway in the threaded portion of the pin. The provision of one or more of the above additional retention means in combination with the present invention provides a very high integrity locking arrangement.

The washer 25 and nut 21 are preferably made of corrosion resistant steel. The grades of the corrosion resistant steel for the washer and the nut may be slightly dissimilar so as to prevent galling at the frusto-conical surfaces 26, 29. Alternatively, one of these frusto-conical surfaces 26, 29 may be treated as an equivalent measure. The pin 26 is preferably made of stainless steel.

Although the invention has been described above with reference to one or more preferred embodiments, it will be appreciated that various changes or modifications may be made without departing from the scope of the invention as defined in the appended claims.

The invention claimed is:

1. A retaining nut comprising a nut body and a plurality of axially extending integrally formed deflectable locking fingers, wherein the locking fingers have a frusto-conical surface opposite a threaded surface, wherein the nut body has an internal thread of the same diameter as the threaded surface of the un-deflected locking fingers, the retaining nut further comprising a circumferential groove between the threaded surfaces of the nut body and the locking fingers.

2. A retaining nut according to claim 1, wherein adjacent locking fingers are separated by a gap.

3. A retaining nut according to claim 1, wherein the nut body has one or more drive features for engagement with a drive tool for rotating the nut.

4. A retaining nut according to claim 1, wherein the frusto-conical surface is inclined at an angle of between approximately 10 to 15 degrees with respect to the nut axis of rotation.

5. A retaining nut and washer combination comprising a retaining nut in accordance with claim 1, and a conical washer, wherein the frusto-conical surface of the nut locking fingers and a frusto-conical surface of the conical washer are co-operating contact surfaces.

6. A combination according to claim 5, wherein the conical washer has one or more drive features for engagement with a drive tool for rotating the washer.

7. An assembly comprising a shaft having a threaded portion and the retaining nut and washer combination according to claim 5, wherein the nut is threadably received on the threaded portion of the shaft, and the frusto-conical surfaces of the washer and the locking fingers co-operate so as to deflect the locking fingers radially towards the shaft.

8. An assembly according to claim 7, wherein the threads of the deflected locking fingers and the shaft bind to prevent rotation of the nut with respect to the shaft.

9. An assembly according to claim 7, wherein the shaft has a shank portion of greater diameter than the threaded portion, and the washer is disposed between the nut and the shank portion.

10. An assembly according to claim 9, further comprising a sleeve disposed around the shank portion of the shaft and having a flange at one end disposed between the washer and the shank portion.

11. An assembly according to claim 10, wherein the sleeve and the shank portion have co-operating features to prevent rotation of the sleeve with respect to the shaft.

12. An assembly according to claim 7, wherein the threaded shaft is an aircraft landing gear pivot pin.

13. An assembly according to claim 7, wherein the threaded shaft has an outer diameter greater than 25 mm, preferably greater than 40 mm.

14. An assembly according to claim 7, wherein the retaining nut is lockable in rotation with respect to the washer.

15. An assembly according to claim 7, wherein the shaft further has
   a shank portion of greater diameter than the threaded portion, with a radially disposed end face formed between the threaded portion and the shank portion;
   and
   the nut is tightened against the radial end face of the shaft.

16. An assembly according to claim 7, wherein the shaft further has
   a shank portion of greater diameter than the threaded portion;
   the washer is disposed between the nut and the shank portion, and
   a sleeve is disposed around the shank portion of the shaft and has a flange at one end disposed between the washer and the shank portion.

17. An assembly comprising:
   a shaft having a threaded portion and a shank portion of greater diameter than the threaded portion;
   a retaining nut having a nut body and a plurality of axially extending integrally formed deflectable locking fingers, wherein the locking fingers have a frusto-conical surface opposite a threaded surface; and
   a conical washer, wherein the frusto-conical surface of the nut locking fingers and a frusto-conical surface of the conical washer are co-operating contact surfaces,
   wherein the nut is threadably received on the threaded portion of the shaft, and the frusto-conical surfaces of the washer and the locking fingers co-operate so as to deflect the locking fingers radially towards the shaft, and the washer is disposed between the nut and the shank, and a sleeve disposed around the shank portion of the shaft and having a flange at one end disposed between the washer and the shank portion, wherein the sleeve and the shank portion have co-operating features to prevent rotation of the sleeve with respect to the shaft.

* * * * *